(12) United States Patent
Mittelberger et al.

(10) Patent No.: US 11,732,780 B2
(45) Date of Patent: Aug. 22, 2023

(54) ELECTRIC VEHICLE TRANSMISSION

(71) Applicant: ZF Friedrichshafen AG, Friedrichshafen (DE)

(72) Inventors: Christian Mittelberger, Ravensburg (DE); Stefan Blattner, Ravensburg (DE); Dennis Wohlfahrt, Friedrichshafen (DE); Thorsten Leim, Friedrichshafen (DE); Kai Bornträger, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/699,584

(22) Filed: Mar. 21, 2022

(65) Prior Publication Data
US 2022/0307573 A1    Sep. 29, 2022

(30) Foreign Application Priority Data

Mar. 26, 2021   (DE) ..................... 10 2021 202 984.1

(51) Int. Cl.
*F16H 3/48*   (2006.01)
*B60K 17/12*   (2006.01)
(Continued)

(52) U.S. Cl.
CPC .............. *F16H 3/48* (2013.01); *B60K 17/02* (2013.01); *B60K 17/12* (2013.01); *B60K 17/22* (2013.01);
(Continued)

(58) Field of Classification Search
CPC ..... F16H 2200/2035; F16H 2200/0021; F16H 2200/2007; F16H 3/64
See application file for complete search history.

(56) References Cited

U.S. PATENT DOCUMENTS 5,931,757 A * 8/1999 Schmidt ................. B60K 6/365
                                                      903/910
7,220,203 B2 * 5/2007 Holmes ................. B60K 6/445
                                                      475/5
(Continued)

FOREIGN PATENT DOCUMENTS

CN      111376715 A    7/2020
DE  10 2011 100 817 A1   11/2012
(Continued)

OTHER PUBLICATIONS

German Patent Office, Search Report in German Patent Application No. 10 2021 202 984.1 (dated Nov. 11, 2021).

*Primary Examiner* — Stacey A Fluhart
(74) *Attorney, Agent, or Firm* — Finch & Maloney, PLLC

(57) ABSTRACT

Disclosed is an electric vehicle transmission (6") comprising a drive input shaft (11), a drive output shaft (13), a first planetary gearset (15), and a second planetary gearset (16). The drive input shaft (11) is provided for connection to an electric machine (7), where each of the first planetary gearset (15) and the second planetary gearset (16) includes a first element (17, 18), a second element (19, 20) and a third element (21, 22), respectively. A first shifting element (A) and a second shifting element (B') are provided, by the selective actuation of which the drive input shaft (11) can be connected to the drive output shaft (13) by means of the planetary gearsets (15, 16) by engaging a gear. Also disclosed is a drive module (2") with such an electric vehicle transmission (6") and a method for operating an electric vehicle transmission (6").

13 Claims, 6 Drawing Sheets

(51) Int. Cl.
*B60K 17/02* (2006.01)
*B60K 17/22* (2006.01)

(52) U.S. Cl.
CPC ............... *F16H 2200/0021* (2013.01); *F16H 2200/0034* (2013.01); *F16H 2200/2007* (2013.01); *F16H 2200/2035* (2013.01)

(56) References Cited

U.S. PATENT DOCUMENTS

| | | | |
|---|---|---|---|
| 9,011,285 B2 | 4/2015 | Märkl | |
| 2012/0035014 A1* | 2/2012 | Moeller | B60K 6/445 |
| | | | 475/5 |
| 2019/0263243 A1* | 8/2019 | Kurth | B60K 6/365 |
| 2019/0331203 A1* | 10/2019 | Mei | B62M 11/145 |
| 2020/0282827 A1* | 9/2020 | Kaltenbach | B60K 17/06 |

FOREIGN PATENT DOCUMENTS

| | | |
|---|---|---|
| DE | 10 2016 212 616 A1 | 1/2018 |
| DE | 10 2018 005 042 B3 | 6/2019 |
| WO | 2020/001859 A1 | 1/2020 |
| WO | WO-2020244703 A1 * 12/2020 | ............... F16H 3/66 |

* cited by examiner

| Gang | A/A' | B/B' |
|------|------|------|
| G1   | x    |      |
| G2   |      | x    |

Fig. 10

ELECTRIC VEHICLE TRANSMISSION

RELATED APPLICATIONS

This application claims the benefit under 35 U.S.C. § 119 as a U.S. National Application of German Patent Application No. 10 2021 202 984.1, filed 26 Mar. 2021, the contents of which are hereby incorporated herein by reference in its entirety.

FIELD OF THE DISCLOSURE

The invention relates to an electric vehicle transmission, comprising a drive input shaft, a drive output shaft and a first planetary gearset and a second planetary gearset, wherein the drive input shaft is provided for connection to an electric machine, wherein the first planetary gearset and the second planetary gearset each comprise a first element, a second element and a third element in the form, respectively, of a sun gear, a planetary web and a ring gear in each case, and wherein a first shifting element and a second shifting element are provided, by the selective actuation of which the drive input shaft can be coupled to the drive output shaft via the planetary gearsets with the engagement of a gear in each case. Furthermore, the invention relates to a drive module for an electric vehicle, an electric vehicle, and a method for operating an electric Vehicle transmission.

BACKGROUND

As with motor vehicles having internal combustion engines as the drive machine, so too in electric vehicles a vehicle transmission is often provided, in each case in a drive-train between the electric machine concerned and drive wheels. In such a case the interposed electric vehicle transmission mostly serves to gear down a drive movement of the electric machine to a slower range, so that the electric vehicle transmission is mostly made with one gear. However, there are also electric vehicle transmissions in which two gears can be engaged.

DE 10 2018 005 042 B3 describes a vehicle transmission which is provided for use in an electric vehicle. In that case, besides a drive input shaft and a drive output shaft the electric vehicle transmission has two planetary gearsets, each consisting of a sun gear, a planetary web and a ring gear. Connected upstream from the two planetary gearsets on the drive input side there is a further planetary gearset by way of which a permanent connection to the drive input shaft is formed. In the installed condition of the electric vehicle transmission, the drive input shaft serves to form a connection to an upstream electric machine. In addition, the electric vehicle transmission has two shifting elements, which are in the form of frictional shifting elements and by the selective actuation of which a power flow route can be established from the drive input shaft, via the planetary gearsets, to the drive output shaft with different transmission ratios.

SUMMARY

Starting from the above-described prior art, the purpose of the present invention is to provide an alternative electric vehicle transmission which is characterized by a compact structure.

This objective is achieved starting from an electric vehicle transmission in combination with its characterizing features. Additional features in each case indicate advantageous further developments of the invention. Additional embodiments relate to a drive module which comprises the electric vehicle transmission. Further embodiments relate to an electric vehicle and to a method for operating an electric vehicle transmission.

According to the invention, an electric vehicle transmission comprises a drive input shaft, a drive output shaft, a first planetary gearset, and a second planetary gearset, wherein the drive input shaft is provided for connection to an electric machine. In each case the first planetary gearset and the second planetary gearset comprise a first element, a second element, and a third element, respectively in the form of a sun gear, a planetary web and a ring gear. Furthermore, a first shifting element and a second shifting element are provided, by the selective actuation of which the drive input shaft can be coupled to the drive output shaft via the planetary gearsets with engagement of a gear in each case.

In the context of the invention, a "shaft" is understood to be a rotating component of the transmission by way of which a power flow route between components, if necessary, with simultaneous actuation of a corresponding shifting element, can be formed. The shaft concerned can connect components axially or radially or even both axially and radially to one another. Thus, the said shaft can also be present as an intermediate element by way of which a concerned component can, for example, be connected radially.

In the context of the invention "axial" means an orientation in the direction of a central longitudinal axis of the transmission, parallel to which rotation axes of the shafts of the transmission and the two planetary gearsets are arranged. "Radial" is then in each case understood to be an orientation in the diametric direction of a respective component of the transmission.

In the electric vehicle transmission according to the invention the drive input shaft is provided in order to form a drive-side connection to an electric machine which, in an installed condition in a drive-train of an electric vehicle, is connected in the power flow upstream from the electric vehicle transmission. For that purpose, the drive input shaft is in particular fitted with a connection piece onto which a rotationally fixed connection of the drive input shaft to a rotor of the electric machine can be formed. In the context of the invention, between the drive input shaft and the rotor of the electric machine at least one further gear step such as a spur gear stage and/or a planetary stage can, if necessary, be provided, by means of which a preliminary gearing of a rotation movement of the rotor of the electric machine connected to the drive input shaft can be obtained. Particularly preferably, however, the drive input shaft of the electric vehicle transmission according to the invention and the rotor of the electric machine are solidly connected so that during operation the rotor and the drive input shaft have the same rotation speed.

In the electric vehicle transmission according to the invention, the drive input shaft and the drive output shaft are in particular arranged coaxially with one another, and also preferably the two planetary gearsets are positioned coaxially relative to the drive input shaft and the drive output shaft. In that way, a particularly compact structure of the electric vehicle transmission in the radial direction can be obtained.

The two planetary gearsets consist in each case of a first element, a second element, and a third element, wherein the elements of each individual planetary gearset consist, respectively, of a sun gear, a planetary web and a ring gear. Particularly preferably the individual planetary gearset is a minus planetary gearset, in which each planetary web carries at least one planetary gearwheel mounted to rotate on it, wherein the at least one planetary gearwheel meshes both with the sun gear and also with the ring gear concerned. In a design of the respective planetary gearsets as minus planetary gearsets, in particular the first element is the sun gear, the second element is the planetary web, and the third element is the ring gear.

Alternatively, in principle one or both of the two planetary gearsets can be in the form of a plus planetary gearset. In that case at least one planetary gearwheel pair is then mounted to rotate on the planetary web concerned, of which planetary gearwheels one planetary gearwheel meshes with the sun gear and one with the ring gear concerned. Moreover, the planetary gearwheels of the at least one planetary gearwheel pair mesh with one another. Other than in a design as a minus planetary gearset, the first element of the planetary gearset concerned is then preferably the sun gear, the second element of the planetary gearset concerned is the ring gear, and the third element of the planetary gearset concerned is the planetary web. Compared with a design as a minus planetary gearset, a stationary gear ratio of the planetary gearset concerned has to be increased by one. As already described earlier, however, in the context of the invention both planetary gearsets are preferably in the form of minus planetary gearsets.

The electric vehicle transmission according to the invention also comprises two shifting elements by the selective actuation of which different gears can be engaged between the drive input shaft and the drive output shaft. In each of the gears, a power flow route is established between the drive input shaft and the drive output shaft by way of the planetary gearsets. Particularly preferably, when the first shifting element is actuated a first gear is engaged and when the second shifting element is actuated a second gear is engaged between the drive input shaft and the drive output shaft. Thus, in particular exactly two gears can be obtained between the drive input shaft and the drive output shaft.

The invention now adopts the technical principle that the first element of the first planetary gearset is connected rotationally fixed to the drive input shaft, whereas the second element of the first planetary gearset and the first element of the second planetary gearset are connected rotationally fixed to one another. Furthermore, the second element of the second planetary gearset is connected rotationally fixed to the drive output shaft, whereas in contrast the third element of the second planetary gearset is held fixed. In addition the third element of the first planetary gearset can be connected rotationally fixed to the drive output shaft by means of the first shifting element, whereas in accordance with an alternative variant of the invention the third element of the first planetary gearset can be held fixed by means of the first shifting element. Finally, two of the elements of the first planetary gearset can be brought into rotationally fixed connection with one another by means of the second shifting element.

In other words, in the electric vehicle transmission according to the invention, the first element of the first planetary gearset and the drive input shaft are permanently connected to one another in a rotationally fixed manner, this preferably being done in the form of a solid connection between the first element of the first planetary gearset and the drive input shaft so that the first element of the first planetary gearset and the drive input shaft rotate at the same rotation speed. In addition, the second element of the first planetary gearset and the first element of the second planetary gearset are permanently connected and rotationally fixed to one another, this being done in particular by way of one or more interposed shafts so that the second element of the first planetary gearset and the first element of the second planetary gearset always rotate at the same rotation speed. Furthermore, the third element of the second planetary gearset is permanently held fixed, and is therefore permanently prevented from moving in rotation. The latter is preferably achieved by connecting the said third element of the second planetary gearset to a permanently fixed structural element, which can be a transmission housing of the electric vehicle transmission, part of the said transmission housing, or a component connected rotationally fixed thereto.

Moreover, in a first variant of the invention an actuation of the first shifting element results in a rotationally fixed connection of the third element of the first planetary gearset to the drive output shaft, so that they rotate together. For that purpose, in an alternative, second variant of the invention, in contrast, the first shifting element ensures that the third element of the first planetary gearset is held fixed so that as a result it is prevented from rotating.

Furthermore, in its closed condition the second shifting element brings about a rotationally fixed connection of two of the elements of the first planetary gearset, whereby when the second shifting element is actuated the first planetary gearset is blocked.

Such a design of an electric vehicle transmission has the advantage that different gears can be obtained between the drive input shaft and the drive output shaft with a compact structure. Furthermore, the electric vehicle transmission according to the invention is characterized by good efficiency.

According to an embodiment of the invention, in its actuated condition the second shifting element connects the first element and the third element of the first planetary gearset rotationally fixed to one another. Alternatively, when the second shifting element is actuated the second element and the third element of the first planetary gearset are brought into rotationally fixed connection with one another. A further alternative to the two variants mentioned above is that when the second shifting element is closed, the first element and the second element of the first planetary are connected and rotationally fixed to one another. In all three of the above variants, when the second shifting element is actuated the first planetary gearset is blocked.

In accordance with a possible embodiment of the invention, the first shifting element is in the form of an interlocking shifting element, in particular a claw-type shifting element. Moreover, the second shifting element is a frictional shifting element, in particular in the form of a disk-type shifting element. Advantageously, in that way a gearshift from a gear engaged by actuating the first shifting element can be carried out under load to a gear obtained by closing the second shifting element. This enables powershifting of the electric vehicle transmission according to the invention. At the same time, when the first shifting element is in its open condition, drag losses are low so that greater efficiency is achieved. Furthermore, with a shifting element made in the form of an interlocking shifting element, it is not necessary to supply an associated actuation device permanently with energy in order to keep the shifting element concerned in its shifting condition, i.e. an open or a closed condition.

In the context of the invention, however, it is also conceivable for both shifting elements to be interlocking shifting element or both of them to be frictional shifting elements. In that way, if both the shifting elements are in the form of interlocking shifting elements the drag losses are low and good efficiency is achieved, whereas in the case both shifting elements being frictional shifting elements, the electric vehicle transmission is fully powershiftable.

In a further development of the invention, a first gear is engaged between the drive input shaft and the drive output shaft when the first shifting element is closed, whereas a second gear can be engaged between the drive input shaft and the drive output shaft when the second shifting element is closed. This variant of the invention is in particular combined with the possible design described immediately previously, so that a gearshift between the first gear and the second gear can consequently be carried out under load.

Preferably, in this case the said gearshift is carried out with the closing of the second shifting element, with slip, overlapping the actuation of the first shifting element. This enables a powershift in traction. Thus, by actuating the second shifting element with slip and producing a corresponding power flow route via the second shifting element, at least essentially a load-free condition is reached at the first shifting element so that the said first shifting element, preferably in the form of an unsynchronized claw-type shifting element, can be opened. After the first shifting element has been opened, the second shifting element is frilly closed so that the associated gear is then engaged.

In a further embodiment of the invention, in the drive input shaft a connection point is provided axially between the first and second planetary gearsets, at which point in the installed condition of the electric vehicle transmission the drive input shaft is connected to the electric machine. This makes it possible to arrange the electric vehicle transmission axially at the level of, and radially inside the electric machine, whereby a more compact overall structure can be produced.

In accordance with a further possible design of the invention, in the drive output shaft a connection point is provided axially on a side of the second planetary gearset facing away from the first planetary gearset, at which point in the installed condition of the electric vehicle transmission a connection of the latter is formed on the drive output side. Advantageously, a drive output can be formed at an axial end of the electric vehicle transmission.

A further object of the invention is a drive module for an electric vehicle, this drive module consisting of an electric machine and an electric vehicle transmission according to one or more of the aforesaid variants. In this case, a rotor of the electric machine is connected rotationally fixed to the drive input shaft of the electric vehicle transmission. By combining the electric vehicle transmission according to the invention with an electric machine, a compact module for use in an electric vehicle can be provided.

Preferably, the electric machine can on the one hand be operated in a generator mode in which it produces electrical energy when the rotor is driven. On the other hand, the electric machine can be operated as an electric motor such that in this operating mode, when electrical energy is supplied to it a drive movement is initiated by producing a rotation movement of the rotor.

In an embodiment of the said drive module, the electric machine is arranged coaxially with the first and second planetary gearsets. This gives a radially compact structure of the drive module. In a further development of this embodiment, the rotor of the electric machine is connected solidly to the drive input shaft so that the rotor and the drive input shaft rotate at the same rotation speed. Alternatively, or even as a supplement to this embodiment, the electric machine is positioned axially overlapping the two planetary gearsets so that the two planetary gearsets are arranged radially inside the electric machine. Advantageously, in that way a nested configuration of the drive module and therefore a particularly compact structure can be produced.

A drive module as described is in particular part of an electric vehicle, which vehicle is preferably a truck or a bus. On the drive output side the electric vehicle transmission of the drive module is then preferably coupled, within a motor vehicle drive-train, to a differential gear system of the electric vehicle, so that by virtue of the differential gear system as a transverse differential a drive movement is distributed to drive wheels of a drive axle. Alternatively, a downstream differential gear system can also be a longitudinal differential, by means of which distribution to more than one driven axles of the electric vehicle takes place. In this case, the differential gear system can be accommodated with the electric vehicle transmission in a common housing.

When two structural elements of the electric vehicle transmission are said to be "connected" or "coupled" to, or "in connection with" one another in a rotationally fixed manner, this means in the context of the invention, that the said structural elements are permanently coupled so that they cannot rotate independently of one another. Accordingly, between these structural elements, which can be elements of the planetary gearsets and/or shafts and/or a rotationally fixed structural element of the transmission, no shifting element is provided, but rather, the corresponding structural elements are coupled to one another with a fixed rotation speed ratio.

In contrast, if a shifting element is provided between two structural elements, then those elements are not coupled rotationally fixed to one another permanently, but a rotationally fixed coupling is only formed by actuating the interposed shifting element. In this, actuation of the shifting element in the context of the invention means that the shifting element concerned is brought to a closed condition and as a result the rotations of the structural elements directly coupled to it are equalized. In the case when the said shifting element is designed as an interlocking shifting element, the structural elements directly connected rotationally fixed to one another by it will rotate with the same rotation speed, whereas in the case of a frictional shifting element a rotation speed difference may persist even after actuation of the shifting element. This desired or even undesired situation is still termed a rotationally fixed connection of the respective structural elements by virtue of the shifting element in the context of the invention.

The invention is not limited to the indicated combination of features specified in the principal claim or the claims that depend on it. There are also possibilities for combining individual features with one another, provided that they emerge from the claims, the description of preferred embodiments of the invention given below, or directly from the drawings. References in the claims to the drawings by the use of indexes are not intended to restrict the protective scope of the claims.

BRIEF DESCRIPTION OF THE DRAWINGS

Advantageous embodiments of the invention, which are explained in what follows, are illustrated in the drawings, which show:

FIG. 10: An example of a shifting scheme of element vehicle transmissions of the drive module shown in FIGS. 2 to 9.

DETAILED DESCRIPTION

Figure 1:
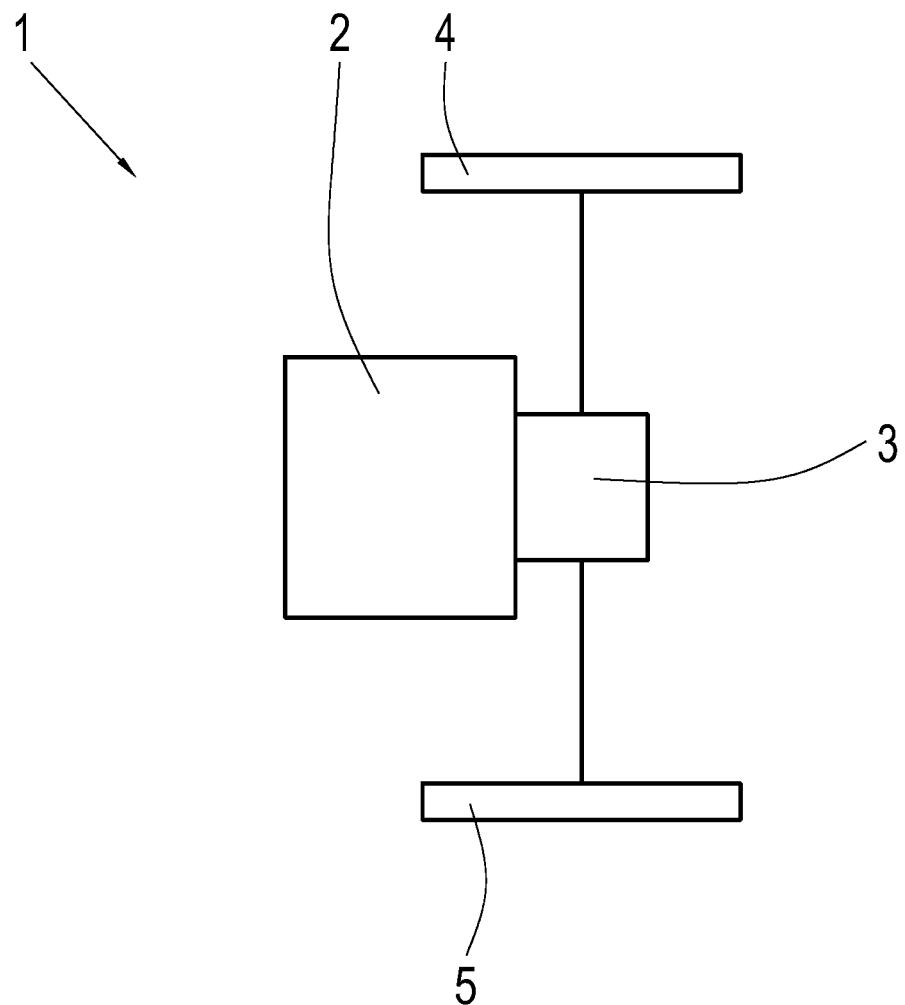
FIG. 1: A schematic view of a motor vehicle drive-train of an electric vehicle.

FIG. 1 shows a schematic representation of a motor vehicle drive-train 1 of an electric vehicle, which is preferably a truck or a bus. In the motor vehicle drive-train 1 a drive module 2 is provided, downstream from the drive output side of which a differential gear system 3 is connected. By way of the differential gear system 3 drive power is distributed to drive wheels 4 and 5 of a drive axle of the electric vehicle. As can be seen in FIG. 1, the drive module 2 and the differential gear system 3 are aligned in the travel direction of the electric vehicle.

Figure 2:
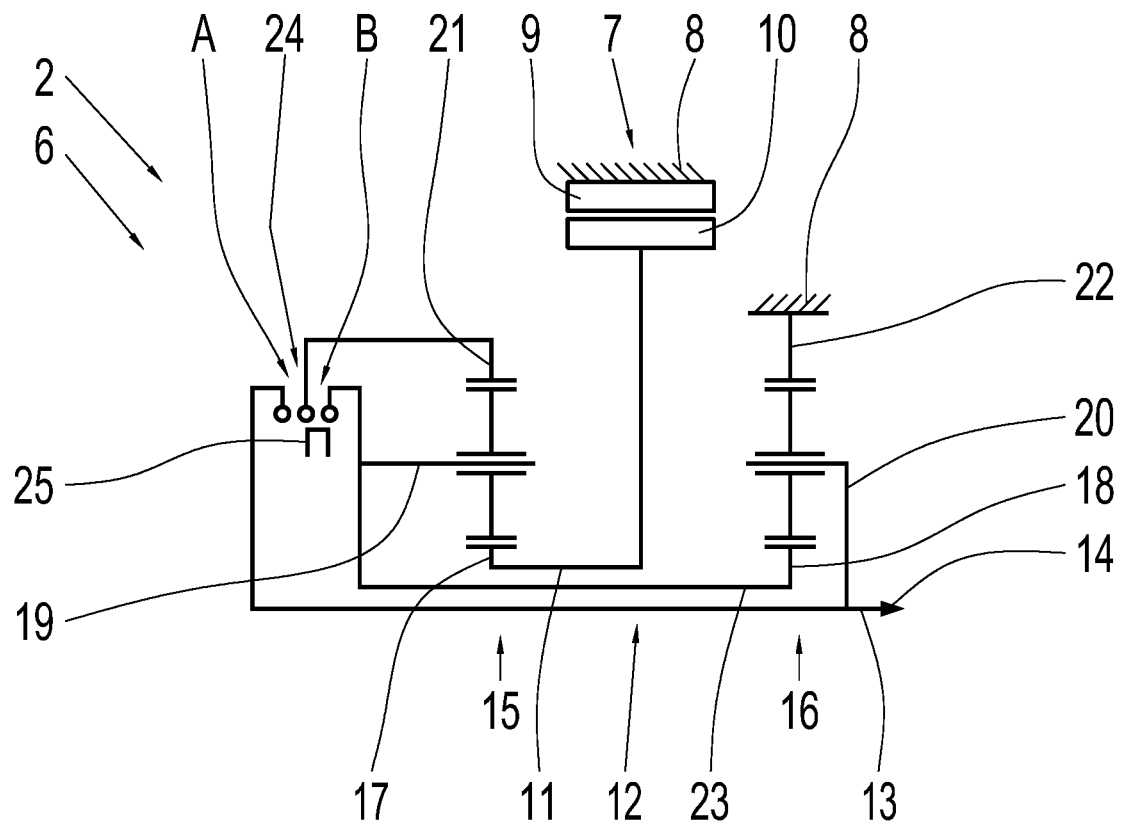
FIGS. 2 to 9: In each case, a schematic view of a drive module of the motor vehicle drive-train shown in FIG. 1, each corresponding to an embodiment of the invention.

FIG. 2 shows a schematic representation of the drive module 2 of the motor vehicle drive-train 1 in FIG. 1, wherein the drive module 2 is designed in accordance with a first possible embodiment of the invention. In this case the drive module 2 consists of an electric vehicle transmission 6 and an electric machine 7, which are accommodated together in a housing 8 of the drive module 2. The electric machine 7 comprises a stator 9 and a rotor 10 positioned radially inside the stator 9. In this case the stator 9 is connected rotationally fixed to the housing 8 of the drive module 2.

The rotor 10 is connected rotationally fixed to a drive input shaft 11 of the electric vehicle transmission 6, this connection being in the form of a solid connection between the rotor 10 and a first connection point 12 of the drive input shaft 11 so that the rotor 10 and the drive input shaft 11 always rotate with the same rotation speed. The electric machine 7 and the drive input shaft 11 are arranged coaxially with one another. Also positioned coaxially with the electric machine 7 and the drive input shaft 11 is a drive output shaft 13 of the electric vehicle transmission 6, and the drive output shaft 13 is connected at a connection point 14 such that the electric vehicle transmission 6 is connected to the downstream differential gear system 3 in FIG. 1.

The electric vehicle transmission 6 also comprises a first planetary gearset 15 and a second planetary gearset 16, each consisting of a first respective element 17 or 18, a second respective element 19 or 20 and a third respective element 21 or 22. In the individual planetary gearset 15 or 16, in this case the first element 17 or 18 is a respective sun gear, the second element 19 or 20 is a respective planetary web, and the third element 21 or 22 is a respective ring gear. The planetary webs in each case carry a plurality of planetary gearwheels, which specifically mesh both with the sun gear and with the ring gear concerned. Accordingly, the two planetary gearsets 15 and 16 are minus planetary gearsets.

As can be seen in FIG. 2, the first element of the first planetary gearset 15 is connected permanently and rotationally fixed to the drive input shaft 11, which correspondingly connects the first element 17 of the first planetary gearset 15 rotationally fixed to the rotor 10 of the electric machine 7. In addition, the second element 19 of the first planetary gearset 15 and the first element 18 of the second planetary gearset 16 are permanently connected and rotationally fixed to one another, that connection being made in this case by way of a shaft 23. Accordingly, the second element 19 of the first planetary gearset 15, the shaft 23 and the first element 18 of the second planetary gearset 16 always rotate with the same rotation speed.

The third element 22 of the second planetary gearset 16 is permanently held fixed, in that the third element 22 is always connected rotationally fixed to the housing 8 of the drive module 2. Moreover, the second element 20 of the second planetary gearset 16 is permanently connected rotationally fixed to the drive output shaft 13, so that the said second element 20 of the second planetary gearset 16 rotates together with the drive output shaft 13.

The electric vehicle transmission 6 also comprises two shifting elements A and B, which are in the form of interlocking shifting elements and specifically unsynchronized claw-type clutches. In this case the two shifting elements A and B are combined in a shifting device 24 and have a common actuating device 25 by means of which, from a neutral position, either the shifting element A or the shifting element B can be changed to a respective actuated position. In the actuated condition the shifting element A connects the third element 21 of the first planetary gearset 15 rotationally fixed to the drive output shaft 13 so that the third element 21 of the first planetary gearset 15 is also connected rotationally fixed to the second element 20 of the second planetary gearset 16.

In contrast, in its actuated condition the shifting element B forms a rotationally fixed connection of the third element 21 of the first planetary gearset 15 to the shaft 23, which also means a rotationally fixed connection between the third element 21 of the first planetary gearset 15 and the second element 19 of the first planetary gearset 15. The result is that actuation of the shifting element B blocks the first planetary gearset 15.

In this case the drive output shaft 13 is essentially in the form of a solid shaft, whereas both the drive input shaft 11 and the shaft 23 are hollow shafts, each axially overlapping the radially inside drive output shaft 13 and surrounding the latter radially. The connection point 12 of the drive input shaft 11 is located axially between the first planetary gearset 15 and the second planetary gearset 16, so that in this area, the rotationally fixed connection to the rotor 10 of the electric machine 7 is also formed. In this case the electric machine 7 is positioned axially overlapping the two planetary gearsets 15 and 16, and the two planetary gearsets 15 and 16 are located radially inside the electric machine 7.

The shifting device 24 with the two shifting elements A and B is arranged axially on a side of the first planetary gearset 15 facing away from the second planetary gearset 16, so that the shifting device 24 is preferably located radially in the area of the third element 21 of the first planetary gearset 15. Finally, the connection point 14 of the drive output shaft 13 is formed axially on a side of the second planetary gearset 16 facing away from the first planetary gearset 15.

Figure 3:
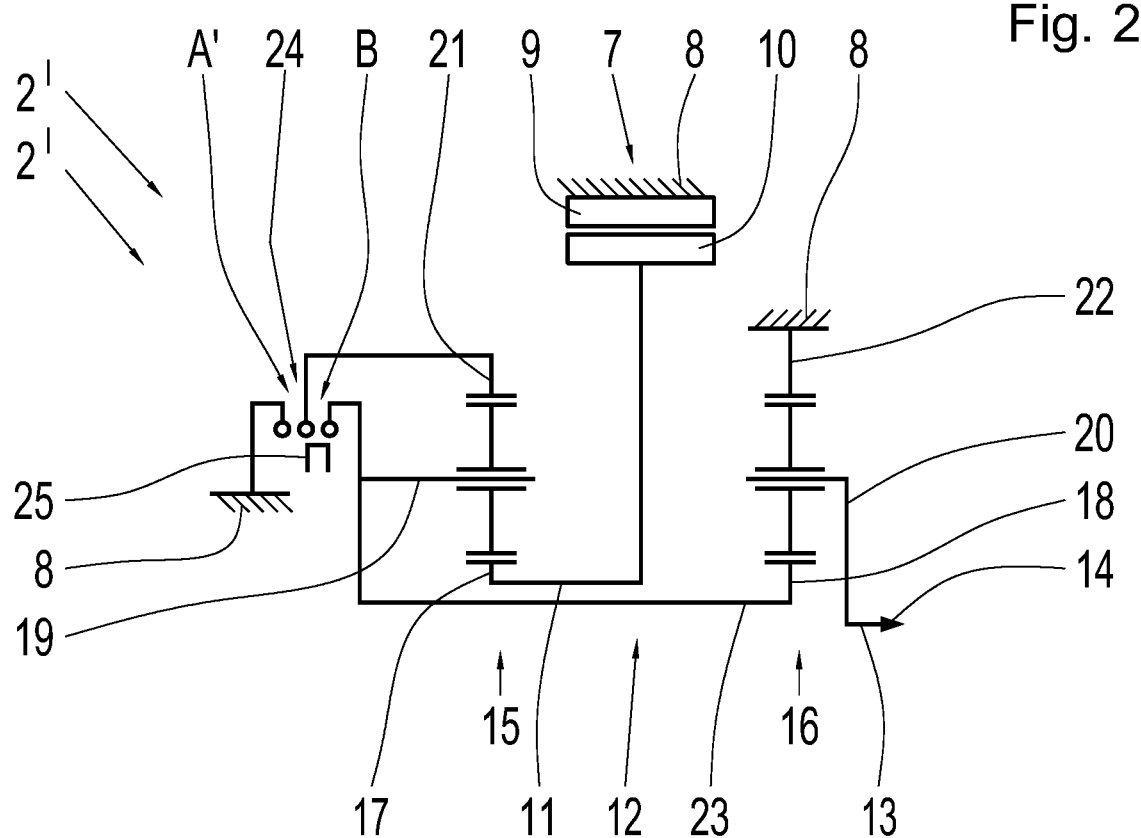

FIG. 3 shows a schematic representation of a drive module 2' which can also be used in the motor vehicle drive-train 1 of FIG. 1. Here, this drive module 2' is designed in accordance with a second possible embodiment of the invention, and therefore corresponds essentially to the previous variant shown in FIG. 2. The difference is, however, that in an electric vehicle transmission 6' of the drive module 2', when actuated a shifting element A' connects the third element 21 of the first planetary gearset 15 fast to the housing 8 of the drive module 8 so that rotation of the said third element 21 of the first planetary gearset 15 is prevented. Correspondingly, the drive output shaft 13 is now connected only to the second element 20 of the second planetary gearset 16, whereas owing to the now no longer necessary ability to be coupled to the third element 21 of the first planetary gearset 15, the drive output shaft 13 can be made as an axially short solid shaft. In other respects, the possible embodiment according to FIG. 3 corresponds to the variant shown in FIG. 2, so that reference can be made to the description of the latter.

Figure 4:
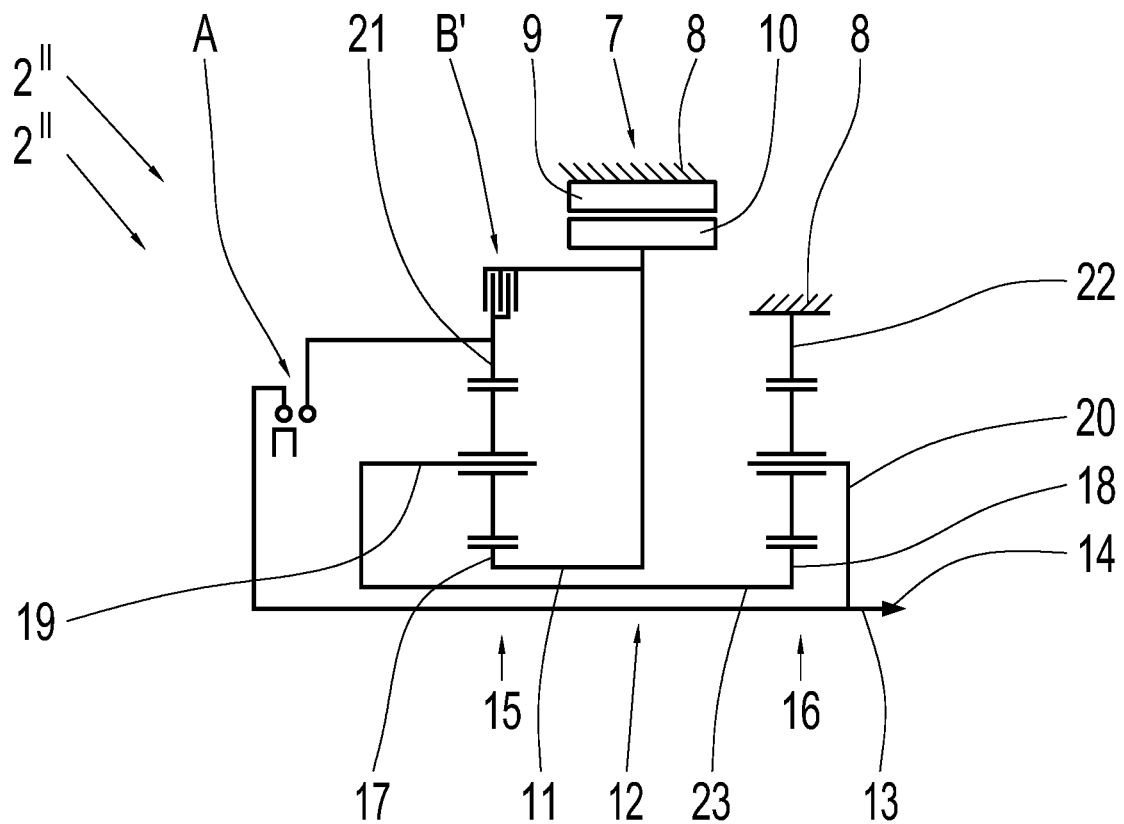

FIG. 4 shows a schematic view of a drive module 2" that corresponds to a third embodiment of the invention, such that this embodiment as well can be used in the motor vehicle drive-train 1 according to FIG. 1. Here, this embodiment too corresponds in very large measure to the variant in FIG. 2, with the difference that in an electric vehicle transmission 6" a shifting element B' is in this case in the form of a frictional shifting element. Specifically, the shifting element B' is a disk clutch. A further difference is that in its actuated state the shifting element B' connects the third element 21 of the first planetary gearset 15 rotationally fixed to the drive input shaft 11, so that correspondingly, when the shifting element B' is actuated the first element 17 of the first planetary gearset 15 and the third element 21 of the first planetary gearset 15 are brought into rotationally fixed connection with one another. This again results in blocking of the first planetary gearset 15. In this case the shifting element B' is arranged axially in a plane with the first planetary gearset 15 and radially surrounding it. In contrast, the shifting element shifting element A is now formed as a single shifting element. In other respects, the embodiment according to FIG. 4 corresponds to the variant in FIG. 2, so reference can be made to the description of the latter.

Figure 5:
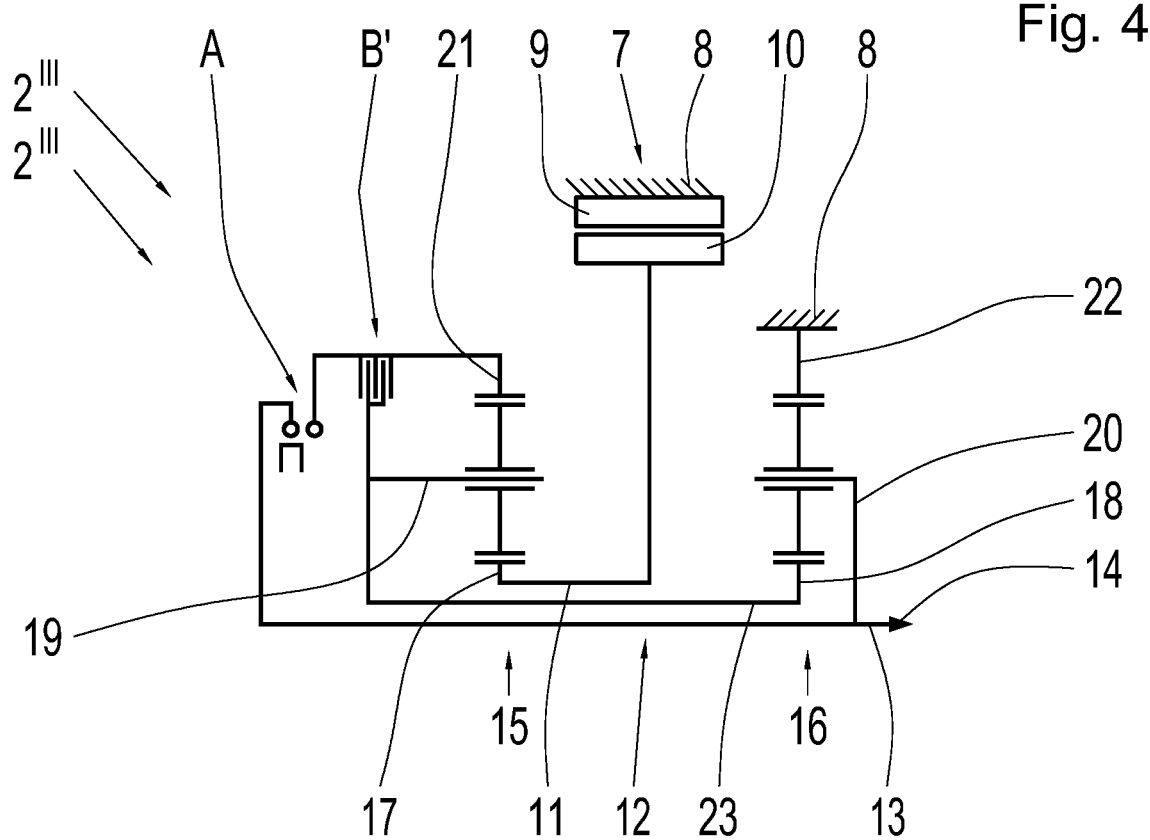

FIG. 5 shows a schematic view of a drive module 2''' according to a fourth possible embodiment of the invention. This drive module 2''' can also be used in the motor vehicle drive-train 1 of FIG. 1 and corresponds in very large measure to the variant in FIG. 2. The difference in this case is that in an electric vehicle transmission 6''' a shifting element B', as already in the previous variant according to FIG. 4, is in the form of a frictional shifting element and specifically a disk clutch. As already in the variant according to FIG. 2, in its actuated condition this shifting element B' connects the third element 21 of the first planetary gearset 15 and the second element 19 of the first planetary gearset 15 rotationally fixed to one another, with the result that the first planetary gearset 15 is blocked. Axially, the shifting element B' is arranged between the shifting element A made as a single shifting element and the first planetary gearset 15. In other respects, the possible embodiment according to FIG. 5 corresponds to the variant in FIG. 2, so reference can be made to the description of the latter.

Figure 6:
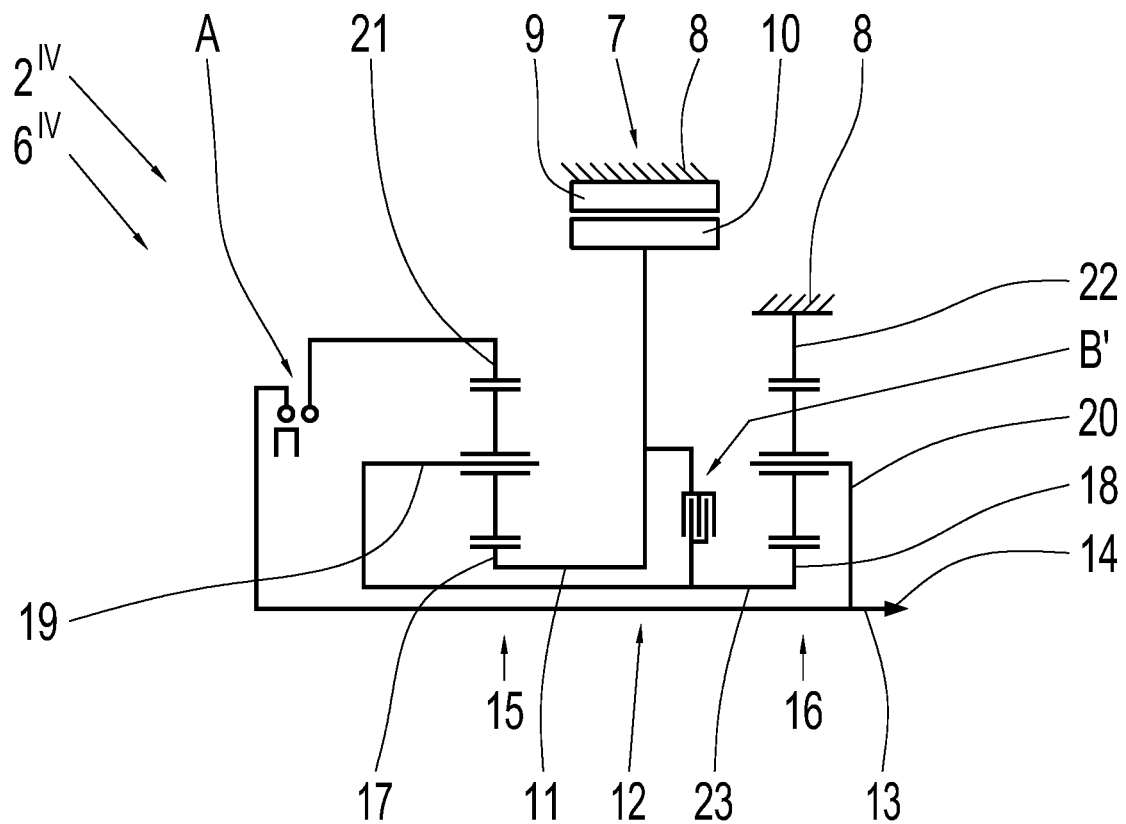

Furthermore, FIG. 6 shows a schematic representation of a drive module $2^{IV}$ designed in accordance with a fifth embodiment of the invention, and which can again be used in the motor vehicle drive-train 1 of FIG. 1. In this case the drive module $2^{IV}$ corresponds essentially to the embodiment according to FIG. 2, the difference being that in an electric vehicle transmission $6^{IV}$ a shifting element B' is again in the form of a frictional shifting element. Specifically, the shifting element B' is a disk clutch and in its actuated state connects the drive input shaft 11 rotationally fixed to the shaft 23, which correspondingly results in a rotationally fixed connection between the first element 17 of the first planetary gearset 15 and the second element 19 of the first planetary gearset 15. Accordingly, when the shifting element B' is actuated the first planetary gearset 15 is blocked. Axially, the shifting element B' is in this case arranged between the connection point 12 of the drive input shaft 11 and the second planetary gearset 16. In other respects, the embodiment according to FIG. 6 corresponds to the variant in FIG. 2, so reference can be made to the description of the latter.

Figure 7:
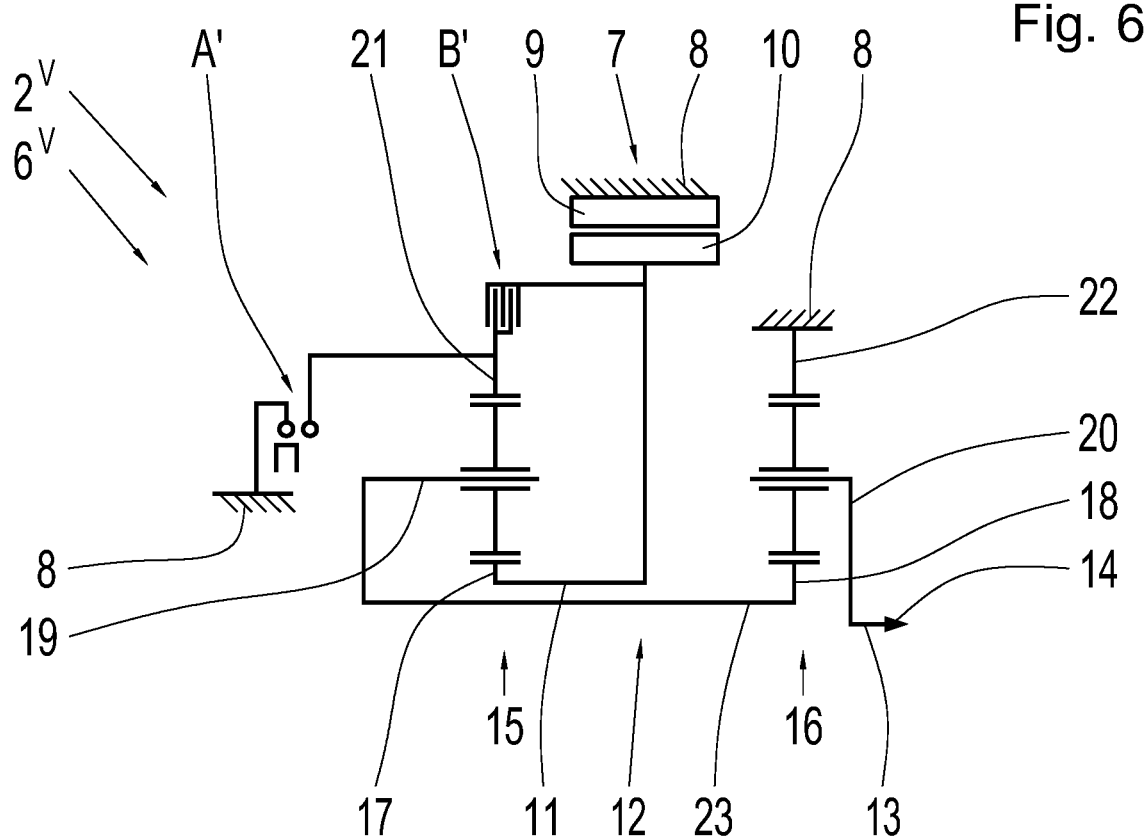

Furthermore, FIG. 7 shows a schematic representation of a drive module $2^V$ which is designed in accordance with a sixth possible embodiment of the invention. Here, this embodiment too can be used in the motor vehicle drive-train 1 of FIG. 1. The drive module $2^V$ corresponds in very large measure to the variant according to FIG. 3, with the difference that in an electric vehicle transmission $6^V$ a shifting element B' is again in the form of a frictional shifting element and specifically, a disk clutch. Moreover, in its actuated state the shifting element B' connects the third element 21 of the first planetary gearset 15 rotationally fixed to the drive input shaft 11, which also results in a rotationally fixed connection between the first element 17 of the first planetary gearset 15 and the third element 21 of the first planetary gearset 15 and thus blocks the first planetary gearset 15. In this case the shifting element B' is arranged axially in a plane with the first planetary gearset 15 and radially around it. In contrast, the shifting element A' is now in the form of a single shifting element. In other respects, the embodiment according to FIG. 7 corresponds to the variant according to FIG. 3, so reference can be made to the description of the latter.

Figure 8:
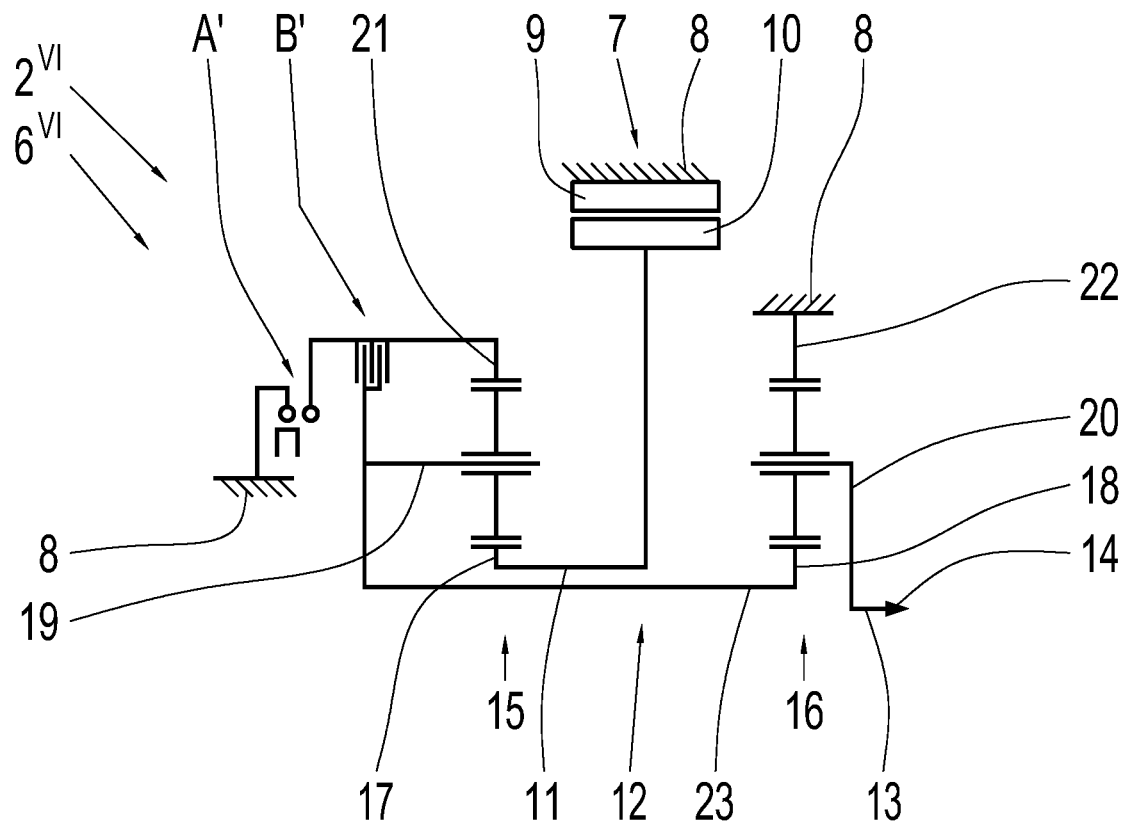

FIG. 8 shows a schematic view of a drive module $2^{VI}$ according to a seventh possible design of the invention. This drive module $2^{VI}$ can also be used in the motor vehicle drive-train in FIG. 1 and it corresponds in very large measure to the variant in FIG. 3. The difference here is that is an electric vehicle transmission $6^{VI}$ a shifting element B' is in the form of a frictional shifting element, specifically a disk clutch. In its actuated condition this shifting element B' connects the third element 21 of the first planetary gearset 15 and the second element 19 of the first planetary gearset 15 rotationally fixed to one another, with the result that the first planetary gearset 15 is blocked. Axially, the shifting element B' is arranged between the shifting element A' and the first planetary gearset 15. In other respects, the embodiment according to FIG. 8 corresponds to the variant according to FIG. 3, so reference can be made to the description of the latter.

Figure 9:
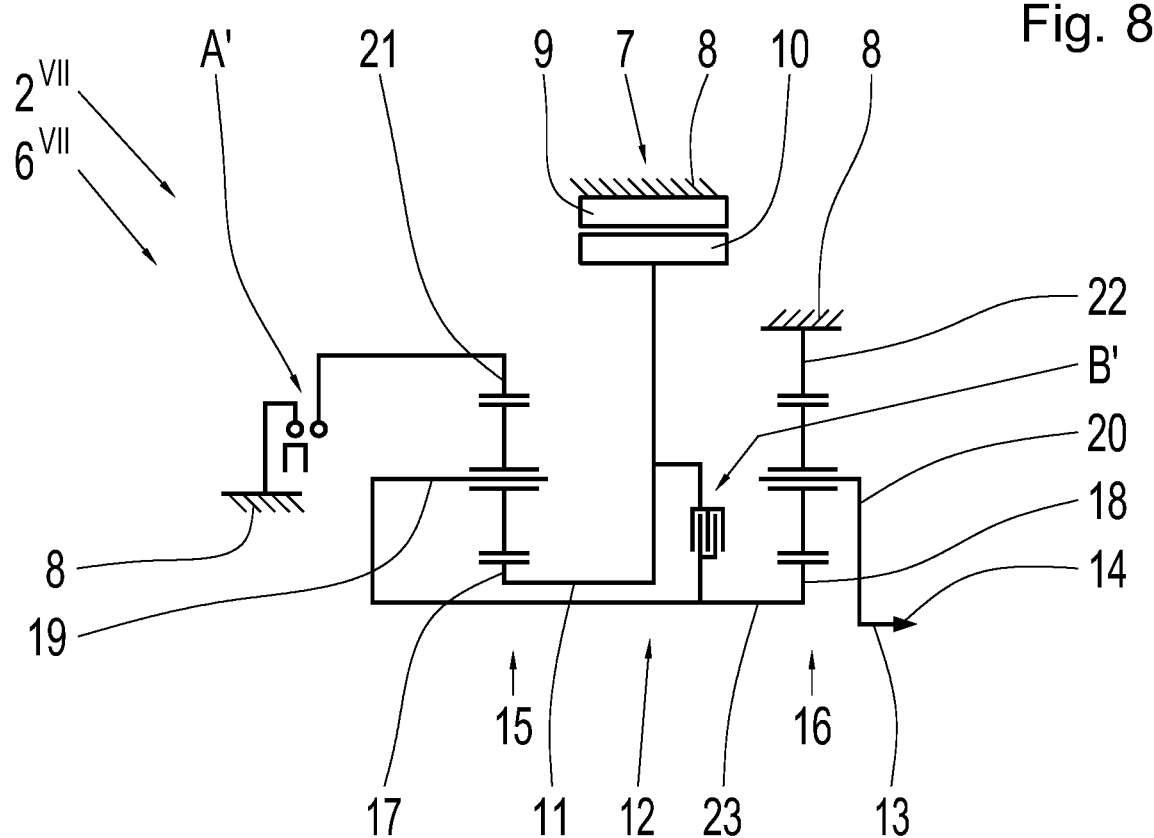

Finally, FIG. 9 shows a schematic representation of a drive module $2^{VII}$ which is designed in accordance with an eighth embodiment of the invention and can also be used in the motor vehicle drive-train 1 of FIG. 1. This drive module $2^{VII}$ corresponds essentially to the embodiment according to FIG. 3, the difference being that in an electric vehicle transmission $6^{VII}$ a shifting element B' is again in the form of a frictional shifting element. The shifting element B' is in the form of a disk clutch and in its actuated condition it connects the drive input shaft 11 rotationally fixed to the shaft 23, which also results in a rotationally fixed connection between the first element 17 of the first planetary gearset 15 and the second element of the first planetary gearset 15. Thus, when the shifting element B' is actuated the first planetary gearset 15 is blocked. Axially, the shifting element B' is arranged between the connection point 12 of the chive input shaft 11 and the second planetary gearset 16. In other respects, the embodiment according to FIG. 9 corresponds to the variant according to FIG. 3, so reference can be made to the description of the latter.

Figure 10:
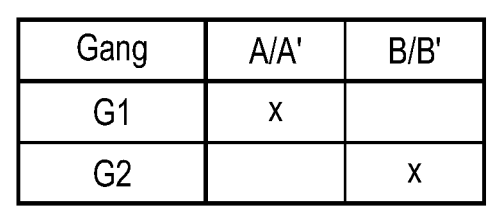

FIG. 10 shows an example shifting scheme for the electric vehicle transmissions 6 to $6^{VII}$ with the drive modules 2 to $2^{VII}$ in FIGS. 2 to 9. As can be seen, in this case two gears G1 and G2 can be obtained. In the columns of the shifting scheme an X indicates which of the shifting elements A or A' and B or B' is closed in each case.

As can be seen in FIG. 10, the first gear G1 is engaged by actuating the shifting element A or A' and the second gear G2 by closing the shifting element B or B'. In the electric vehicle transmissions 6" to $6^{VII}$ a gearshift from the gear G1 to the gear G2 can be carried out under load, since the shifting element B' is in the form of a frictional shifting element. In the present case that is done by closing the shifting element B' with slip while the shifting element A or A' is in its actuated condition, and thereby partially taking up the load by the shifting element B'. When the shifting element A or A' is then essentially free from load, the shifting element A or A' is opened and thereafter the shifting element B' is fully closed.

In contrast, in the two electric vehicle transmissions 6 and 6' in FIGS. 2 and 3 gearshifts between the gears G1 and G2 can only be carried out with traction force interruption, since here both of the two shifting elements A or A' and B are interlocking shifting elements.

The gears G1 and G2 can each be used for driving the electric vehicle by means of the electric machine 7 when the electric machine 7 is operated as an electric motor. Moreover, in the gears G1 and G2 braking with recuperation can also be carried out in each case by operating the electric machine 7 as a generator.

By virtue of the designs of an electric vehicle transmission according to the invention, a compact structure can be realized.

INDEXES

Motor vehicle drive-train
2 to $2^{VII}$ Drive module
3 Differential gear system
4 Drive wheel
5 Drive wheel
6 to $6^{VII}$ Electric vehicle transmission
7 Electric machine
8 Housing
9 Stator
10 Rotor
11 Drive input shaft
12 Connection point
13 Drive output shaft
14 Connection point
15 Planetary gearset
16 Planetary gearset
17 First element
18 First element
19 Second element
20 Second element
21 Third element
22 Third element
23 Shaft
24 Shifting device
25 Actuating device
A, A' Shifting element
B, B' Shifting element
G1 Gear
G2 Gear

The invention claimed is:

1. Electric vehicle transmission, comprising:
a drive input shaft, the drive input shaft configured for connection to an electric machine;
a drive output shaft;
a first planetary gearset and a second planetary gearset, wherein the first planetary gearset and the second planetary gearset each comprise a first element, a second element, and a third element, respectively, in the form of a sun gear, a planetary web, and a ring gear, in each case; and
wherein a first shifting element and a second shifting element are provided, by the selective actuation of which the drive input shaft can be coupled to the drive output shaft by way of the planetary gearsets with the engagement of a gear in each case;
wherein:
the first element of the first planetary gearset is connected rotationally fixed to the drive input shaft;
the second element of the first planetary gearset is connected rotationally fixed to the first element of the second planetary gearset;
the second element of the second planetary gearset is connected rotationally fixed to the drive output shaft;
the third element of the second planetary gearset is held fixed;
the third element of the first planetary gearset can be connected rotationally fixed to the drive output shaft by means of the first shifting element, or the third element of the first planetary gearset can be held fixed by means of the first shifting element;
two of the elements of the first planetary gearset can be brought into rotationally fixed connection with one another by means of the second shifting element; and
a connection point in the drive input shaft axially between the first planetary gearset and the second planetary gearset, the connection point configured to connect the drive input shaft to the electric machine.

2. The electric vehicle transmission according to claim 1, wherein in its actuated condition the second shifting element connects the first element in a rotationally fixed manner to the third element of the first planetary gearset, or connects the second element in a rotationally fixed manner to the third element of the first planetary gearset, or connects the first element in a rotationally fixed manner to the second element of the first planetary gearset.

3. The electric vehicle transmission according to claim 1, wherein the first shifting element is in the form of an interlocking shifting element and the second shifting element is a frictional shifting element.

4. The electric vehicle transmission according to claim 3, wherein the first shifting element is a claw-type shifting element, and the second shifting element is a disk clutch.

5. The electric vehicle transmission according to claim 1, wherein a first gear between the drive input shaft and the drive output shaft is obtained by closing the first shifting element and a second gear between the drive input shaft and the drive output shaft is obtained by actuating the second shifting element.

6. The electric vehicle transmission according to claim 1, further comprising a connection point in the drive output shaft axially on a side of the second planetary gearset that faces away from the first planetary gearset, the connection point in the drive output shaft configured to connect the drive output shaft to a differential gear system.

7. A drive module for an electric vehicle, comprising an electric machine with a rotor; and
an electric vehicle transmission according to claim 1, wherein the rotor of the electric machine is connected rotationally fixed to the drive input shaft of the electric vehicle transmission.

8. The drive module according to claim 7, wherein the electric machine is arranged coaxially with the first planetary gearset and the second planetary gearset of the electric vehicle transmission.

9. The drive module according to claim 8, wherein the rotor of the electric machine is fixedly connected to the drive input shaft.

10. The drive module according to claim 9, wherein the electric machine is positioned axially overlapping the two planetary gearsets, and the two planetary gearsets are arranged radially inside the electric machine.

11. An electric vehicle comprising at least one drive module according to claim 7.

12. The electric vehicle of claim 11, wherein the electric vehicle is selected from a bus or a truck.

13. A method for operating an electric vehicle transmission according to claim 1, the method comprising:
   closing the second shifting element with slip;
   actuating the first shifting element; and
   changing between the first gear and the second gear under load,
   wherein closing the second shifting element overlaps with actuating the first shifting element.

* * * * *